US010782666B2

(12) United States Patent
 Agarwal

(10) Patent No.: US 10,782,666 B2
(45) Date of Patent: Sep. 22, 2020

(54) DYNAMICALLY ADAPTIVE PERSONALIZED SMART ENERGY PROFILES

(71) Applicant: Tendril Networks, Inc., Boulder, CO (US)

(72) Inventor: Ashish Agarwal, Longmont, CO (US)

(73) Assignee: Tendril EA, LLC, Boulder, CO (US)

( * ) Notice: Subject to any disclaimer, the term of this patent is extended or adjusted under 35 U.S.C. 154(b) by 61 days.

(21) Appl. No.: 16/367,163

(22) Filed: Mar. 27, 2019

(65) Prior Publication Data

US 2019/0324417 A1 Oct. 24, 2019

Related U.S. Application Data

(63) Continuation of application No. 15/232,659, filed on Aug. 9, 2016, now Pat. No. 10,281,895, which is a
(Continued)

(51) Int. Cl.
  *G05B 19/048* (2006.01)
  *G05B 15/02* (2006.01)
  (Continued)

(52) U.S. Cl.
  CPC .......... *G05B 19/048* (2013.01); *G05B 15/02* (2013.01); *F24F 11/54* (2018.01); *F24F 11/57* (2018.01);
  (Continued)

(58) Field of Classification Search
  CPC ..... H04L 12/282; G05B 15/02; G05B 19/042; F24F 11/57; F24F 11/0086; F24F 11/54
  See application file for complete search history.

(56) References Cited

U.S. PATENT DOCUMENTS 4,401,943 A   8/1983 Morris et al.
5,179,556 A   1/1993 Turner
(Continued)

FOREIGN PATENT DOCUMENTS

WO  0074306       12/2000
WO  2012068503 A1  5/2012
WO  2014085777 A1  6/2014

OTHER PUBLICATIONS

Ahmad et al. "Computational intelligence techniques for HVAC systems: A review." Building Simulation, Tsinghua University Press, vol. 9, No. 4, Mar. 31, 2016, pp. 359-398, 40 pages.
(Continued)

*Primary Examiner* — Ronald D Hartman, Jr.
(74) *Attorney, Agent, or Firm* — Perkins Coie LLP

(57) ABSTRACT

A facility employing systems, methods, and/or techniques for dynamically and adaptively configuring configurable energy consuming and producing devices (e.g., smart energy devices) based on user profiles and user presence information is disclosed. In some embodiments, the facility periodically detects the presence of users, and retrieves preference information for those users. For each of one or more configurable energy devices in the area, the facility generates a combined setting based on the preferences of each user present and adjusts the devices based on the combined settings. For example, if User A, User B, and User C are present in a room and User A's preferred temperature setting is 75° F., User B's preferred temperature setting is 68° F., and User C's preferred temperature setting is 70° F., the facility may generate a combined setting for a thermostat by taking the average value of the users in the room.

20 Claims, 9 Drawing Sheets

Related U.S. Application Data continuation of application No. 13/761,119, filed on Feb. 6, 2013, now Pat. No. 9,423,779.

(51) Int. Cl.
  *H04L 12/28* (2006.01)
  *F24F 11/54* (2018.01)
  *F24F 11/57* (2018.01)

(52) U.S. Cl.
  CPC .... *G05B 2219/2642* (2013.01); *H04L 12/282* (2013.01)

(56) References Cited

U.S. PATENT DOCUMENTS

| | | | |
|---|---|---|---|
| 5,510,975 A * | 4/1996 | Ziegler, Jr. | G05B 13/028 700/49 |
| 5,572,438 A | 11/1996 | Ehlers et al. | |
| 5,684,710 A | 11/1997 | Ehlers et al. | |
| 5,696,695 A | 12/1997 | Ehlers et al. | |
| 5,719,861 A | 2/1998 | Okanoue | |
| 5,865,991 A | 2/1999 | Hsu | |
| 5,924,486 A | 7/1999 | Ehlers et al. | |
| 5,949,976 A | 9/1999 | Chappelle | |
| 5,959,529 A | 9/1999 | Kail, IV | |
| 6,028,857 A | 2/2000 | Poor | |
| 6,092,207 A | 7/2000 | Kolinski et al. | |
| 6,178,362 B1 | 1/2001 | Woolard et al. | |
| 6,208,247 B1 | 3/2001 | Agre et al. | |
| 6,216,956 B1 | 4/2001 | Ehlers et al. | |
| 6,498,955 B1 | 12/2002 | McCarthy et al. | |
| 6,631,309 B2 | 10/2003 | Boies et al. | |
| 6,640,248 B1 | 10/2003 | Jorgensen | |
| 6,680,922 B1 | 1/2004 | Jorgensen | |
| 6,684,339 B1 | 1/2004 | Willig | |
| 6,754,504 B1 | 6/2004 | Reed | |
| 6,785,592 B1 | 8/2004 | Smith et al. | |
| 6,859,831 B1 | 2/2005 | Gelvin et al. | |
| 6,947,483 B2 | 9/2005 | Engwer | |
| 7,058,657 B1 | 6/2006 | Berno | |
| 7,062,389 B2 | 6/2006 | Johnson et al. | |
| 7,130,719 B2 | 10/2006 | Ehlers et al. | |
| 7,171,287 B2 | 1/2007 | Weiss | |
| 7,216,021 B2 | 5/2007 | Matsubara et al. | |
| 7,245,947 B2 | 7/2007 | Salokannel et al. | |
| 7,263,450 B2 | 8/2007 | Hunter | |
| 7,266,428 B2 | 9/2007 | Alexanian | |
| 7,302,634 B2 | 11/2007 | Lucovsky et al. | |
| 7,333,821 B2 | 2/2008 | Willey | |
| 7,356,548 B1 | 4/2008 | Culp et al. | |
| 7,364,093 B2 | 4/2008 | Garozzo | |
| 7,505,852 B2 | 3/2009 | Board | |
| 7,539,488 B2 | 5/2009 | Friedman | |
| 7,552,033 B1 | 6/2009 | Culp et al. | |
| 7,769,611 B1 | 8/2010 | Rodriguez et al. | |
| 7,966,104 B2 | 6/2011 | Srivastava et al. | |
| 8,014,905 B2 | 9/2011 | Ehlers | |
| 8,176,095 B2 | 5/2012 | Murray et al. | |
| 8,239,046 B2 | 8/2012 | Koehler et al. | |
| 8,265,776 B2 | 9/2012 | Osann et al. | |
| 8,332,055 B2 | 12/2012 | Veillette | |
| 8,510,255 B2 | 8/2013 | Fadell et al. | |
| 8,515,878 B2 | 8/2013 | Radloff et al. | |
| 8,554,376 B1 | 10/2013 | Matsuoka et al. | |
| 8,560,128 B2 | 10/2013 | Ruff et al. | |
| 8,583,531 B2 | 11/2013 | Hirl et al. | |
| 8,730,057 B2 | 5/2014 | Dalla | |
| 8,761,945 B2 | 6/2014 | Hadzidedic et al. | |
| 8,892,264 B2 | 11/2014 | Steven et al. | |
| 8,977,404 B2 | 3/2015 | Benes et al. | |
| 9,003,343 B2 | 4/2015 | Zhou et al. | |
| 9,026,261 B2 | 5/2015 | Bukhin et al. | |
| 9,298,197 B2 | 3/2016 | Fisher et al. | |
| 9,310,815 B2 | 4/2016 | Shiflet | |
| 9,329,212 B2 | 5/2016 | Bones et al. | |
| 9,423,779 B2 | 8/2016 | Agarwal | |
| 9,471,718 B2 | 10/2016 | Bukhin et al. | |
| 9,576,472 B2 | 2/2017 | Koch | |
| 9,696,055 B1 * | 7/2017 | Goodman | F24F 11/62 |
| 9,722,813 B2 | 8/2017 | Benes et al. | |
| 10,281,895 B2 | 5/2019 | Agarwal | |
| 10,379,508 B2 | 8/2019 | Shiflet | |
| 10,697,662 B2 * | 6/2020 | Matsuoka | F24F 11/62 |
| 10,708,077 B2 * | 7/2020 | Cui | F24F 11/54 |
| 2002/0002636 A1 | 1/2002 | Vange et al. | |
| 2002/0071398 A1 | 6/2002 | Moran et al. | |
| 2002/0158763 A1 | 10/2002 | Takarada et al. | |
| 2003/0069970 A1 | 4/2003 | Kim et al. | |
| 2003/0083758 A1 | 5/2003 | Williamson | |
| 2003/0190912 A1 | 10/2003 | Jampolsky et al. | |
| 2003/0191955 A1 | 10/2003 | Wagner et al. | |
| 2003/0216837 A1 * | 11/2003 | Reich | G05B 15/02 700/276 |
| 2004/0034684 A1 | 2/2004 | Payne | |
| 2004/0117330 A1 | 6/2004 | Ehlers et al. | |
| 2004/0133314 A1 | 7/2004 | Ehlers et al. | |
| 2004/0138981 A1 | 7/2004 | Ehlers et al. | |
| 2004/0139038 A1 | 7/2004 | Ehlers et al. | |
| 2004/0249515 A1 | 12/2004 | Johnson et al. | |
| 2004/0260411 A1 | 12/2004 | Cannon | |
| 2004/0262410 A1 | 12/2004 | Hull | |
| 2005/0038571 A1 | 2/2005 | Brickfield et al. | |
| 2005/0043829 A1 | 2/2005 | Rossides | |
| 2005/0055137 A1 | 3/2005 | Andren et al. | |
| 2005/0060107 A1 | 3/2005 | Rodenberg et al. | |
| 2005/0095978 A1 | 5/2005 | Blunn et al. | |
| 2005/0096060 A1 | 5/2005 | Rajkotia et al. | |
| 2005/0096857 A1 | 5/2005 | Hunter | |
| 2005/0124358 A1 | 6/2005 | Willey | |
| 2005/0125083 A1 | 6/2005 | Kiko | |
| 2005/0157723 A1 | 7/2005 | Kim et al. | |
| 2005/0171645 A1 | 8/2005 | Oswald et al. | |
| 2006/0005046 A1 | 1/2006 | Hars | |
| 2006/0143600 A1 | 6/2006 | Cottrell et al. | |
| 2006/0200542 A1 | 9/2006 | Willig | |
| 2006/0200658 A1 | 9/2006 | Penkethman | |
| 2006/0209789 A1 | 9/2006 | Gupta et al. | |
| 2006/0276938 A1 | 12/2006 | Miller | |
| 2007/0043477 A1 | 2/2007 | Ehlers et al. | |
| 2007/0043478 A1 | 2/2007 | Ehlers et al. | |
| 2007/0045431 A1 * | 3/2007 | Chapman, Jr. | F24F 11/30 236/46 C |
| 2007/0097993 A1 | 5/2007 | Bojahra et al. | |
| 2007/0173978 A1 | 7/2007 | Fein et al. | |
| 2007/0174644 A1 | 7/2007 | Willig | |
| 2007/0239317 A1 | 10/2007 | Bogolea et al. | |
| 2007/0251461 A1 | 11/2007 | Reichard et al. | |
| 2008/0021749 A1 | 1/2008 | Hope et al. | |
| 2008/0065816 A1 | 3/2008 | Seo | |
| 2008/0129495 A1 | 6/2008 | Hitt | |
| 2008/0256445 A1 | 10/2008 | Ziff et al. | |
| 2008/0263196 A1 | 10/2008 | Kansal et al. | |
| 2008/0271123 A1 | 10/2008 | Ollis et al. | |
| 2008/0277486 A1 | 11/2008 | Seem et al. | |
| 2008/0300906 A1 | 12/2008 | Doi et al. | |
| 2008/0306985 A1 | 12/2008 | Murray et al. | |
| 2009/0007706 A1 | 1/2009 | Hitt et al. | |
| 2009/0045256 A1 | 2/2009 | McInerney et al. | |
| 2009/0059842 A1 | 3/2009 | Maltseff et al. | |
| 2009/0115597 A1 | 5/2009 | Giacalone | |
| 2009/0135018 A1 | 5/2009 | Veillette et al. | |
| 2009/0135836 A1 | 5/2009 | Veillette | |
| 2009/0320012 A1 | 12/2009 | Lee et al. | |
| 2010/0010678 A1 | 1/2010 | Dawson et al. | |
| 2010/0031324 A1 | 2/2010 | Strich et al. | |
| 2010/0042453 A1 | 2/2010 | Scaramellino et al. | |
| 2010/0042720 A1 | 2/2010 | Stienhans et al. | |
| 2010/0070101 A1 | 3/2010 | Benes et al. | |
| 2010/0070102 A1 | 3/2010 | Benes et al. | |
| 2010/0097225 A1 | 4/2010 | Petricoin | |
| 2010/0100253 A1 | 4/2010 | Fausak et al. | |
| 2010/0107112 A1 | 4/2010 | Jennings et al. | |
| 2010/0156665 A1 | 6/2010 | Krzyzanowski et al. | |
| 2011/0029341 A1 | 2/2011 | Muse et al. | |

(56) References Cited

U.S. PATENT DOCUMENTS

| | | |
|---|---|---|
| 2011/0032070 A1 | 2/2011 | Bleile et al. |
| 2011/0040785 A1 | 2/2011 | Steenberg et al. |
| 2011/0046805 A1 | 2/2011 | Bedros et al. |
| 2011/0144932 A1 | 6/2011 | Alles |
| 2011/0166710 A1 | 7/2011 | Kordik et al. |
| 2011/0227417 A1 | 9/2011 | Walker |
| 2011/0231320 A1 | 9/2011 | Irving |
| 2011/0251807 A1 | 10/2011 | Rada et al. |
| 2011/0289019 A1 | 11/2011 | Radloff et al. |
| 2011/0313964 A1 | 12/2011 | Sanchey Loureda et al. |
| 2012/0029717 A1 | 2/2012 | Cox et al. |
| 2012/0053740 A1 | 3/2012 | Venkatakrishnan et al. |
| 2012/0065789 A1 | 3/2012 | Scelzi et al. |
| 2012/0079092 A1 | 3/2012 | Woxblom et al. |
| 2012/0101651 A1 | 4/2012 | Haynes |
| 2012/0173456 A1 | 7/2012 | Hirl |
| 2012/0203379 A1 | 8/2012 | Sloo et al. |
| 2012/0246279 A1 | 9/2012 | Zang et al. |
| 2012/0316687 A1 | 12/2012 | Chen et al. |
| 2012/0323637 A1 | 12/2012 | Cushing et al. |
| 2013/0013121 A1 | 1/2013 | Henze et al. |
| 2013/0103207 A1 | 4/2013 | Ruff et al. |
| 2013/0170481 A1 | 7/2013 | Crawford et al. |
| 2013/0178986 A1 | 7/2013 | Lombard et al. |
| 2014/0101082 A1 | 4/2014 | Matsuoka et al. |
| 2014/0222241 A1 | 8/2014 | Ols |
| 2014/0277761 A1* | 9/2014 | Matsuoka ......... G05D 23/1904 700/276 |
| 2014/0297001 A1 | 10/2014 | Silverman et al. |
| 2014/0309869 A1 | 10/2014 | Ricci |
| 2014/0309892 A1 | 10/2014 | Ricci |
| 2014/0371921 A1 | 12/2014 | Weaver et al. |
| 2015/0032264 A1* | 1/2015 | Emmons ................. F24F 11/30 700/276 |
| 2015/0100167 A1* | 4/2015 | Sloo ....................... H05B 47/11 700/278 |
| 2015/0168002 A1* | 6/2015 | Plitkins ................... F24F 11/70 165/237 |
| 2015/0178421 A1 | 6/2015 | Borrell et al. |
| 2015/0198346 A1 | 7/2015 | Vedpathak |
| 2015/0248118 A1 | 9/2015 | Li et al. |
| 2015/0277409 A1 | 10/2015 | Yamada |
| 2015/0369847 A1 | 12/2015 | Roosli |
| 2016/0088438 A1* | 3/2016 | O'Keeffe ................ H01H 9/02 455/456.2 |
| 2016/0131388 A1* | 5/2016 | Eiynk .................... G05B 15/02 707/728 |
| 2016/0201934 A1 | 7/2016 | Hester et al. |
| 2016/0313751 A1 | 10/2016 | Risbeck et al. |
| 2017/0055126 A1* | 2/2017 | O'Keeffe ............. H04W 4/023 |

OTHER PUBLICATIONS

An, Lianjun et al. "An inverse PDE-ODE model for studying building energy demand." Proceedings of the 2013 Winter Simulation Conference, Dec. 8, 2013, pp. 1869-1880, 12 pages.

De Angelis et al. Optimal Home Energy Management Under Dynamic Electrical and Thermal Constraints, IEEE Transactions on Industrial Informatics; vol. 9, issue. 3; 1518-1527, 2012, 12 pages.

European Patent Office, Extended European Search Report, EP Patent Application 17776874.4, dated Nov. 13, 2019, 13 pages.

International Search Report and Written Opinion dated June 21, 2017, for International Patent Application No. PCT/US2017/025606filed Mar. 31, 2017, 53 pages.

Vakiloroaya et al. A review of different strategies for HVAC energy saving. Energy, Conversion and Management; vol. 77; 735-754, 2014, 19 pages.

Bullis, Kevin, "Dumb Meters Get Smarter," <http://www.technologyreview.com/energy/22366>, Mar. 31, 2009, 2 pages.

Dave's Tech Blog, "Itron Remote Read Electric Meter," <http://davestech.blogspot.com/2008/02/itron-remote-read-electric-meter.html>, internet accessed on Nov. 8, 2010, 22 pages.

Doebber, I. "Investigation of Concrete Wall Systems for Reducing Heating and Cooling Requirements in Single Family Residences" [online], Sep. 2004, [retrieved on Mar. 9, 2014]. Retrieved from the Internet:<URL: http://scholar.lib.vt.edu/theses/available/.

Extended European Search Report; European Patent Application No. 13824847.1; dated Jun. 7, 2016; 7 pages.

Hancock, Gregory, "Power monitoring to the people!" <http://www.gridinsight.com/2009/02/power-monitoring-to-the-people.html>, Feb. 25, 2009, 4 pages.

"http://blog.microsoft-hohm.com/Hohm-energy-report-sample.aspx, accessed on Aug. 9, 2010".

"http://efficiency20.com/, accessed on Aug. 9, 2010".

"http://hes.lbl.gov/consumer, accessed on Aug. 9, 2010".

"http://onzo.com/solutions/, accessed on Aug. 9, 2010".

"http://silverspringnetworks.com/products/index.html, accessed on Aug. 9, 2010".

"http://www.agilewaves.com/, accessed on Aug. 9, 2010".

"http://www.alertme.com/, accessed on Aug. 9, 2010".

"http://www.ambientdevices.com/products/energyjoule.html, accessed on Aug. 9, 2010".

"http://www.bluelineinnovations.com, accessed on Aug. 9, 2010".

"http://www.consert.com/, accessed on Aug. 9, 2010".

"http://www.diykyoto.com/, accessed on Aug. 9, 2010".

"http://www.energy-aware.com/, accessed on Aug. 9, 2010".

"http://www.energyhub.net, accessed on Aug. 9, 2010".

"http://www.google.com/powermeter/about/, accessed on Aug. 9, 2010".

"http://www.greenenergyoptions.co.uk/, accessed on Aug. 9, 2010".

"http://www.lem.com/hq/en/content/view/276/215/, accessed on Aug. 9, 2010".

"http://www.opower.com/Products/Overview,aspx, accessed on Aug. 9, 2010".

"http://www.powermand.com/dreamwatts-product, accessed on Aug. 9, 2010".

"http://www.tendrilinc.com/products/vision/,accessed on Aug. 9, 2010".

"http://www.theenergydetective.com/home, accessed on Aug. 9, 2010".

"http://www.theowl.com/, accessed on Aug. 9, 2010".

International Preliminary Report on Patentability and Written Opinion; International Patent Application No. PCT/US2013/053317; Applicant Tendril Networks, Inc.; dated Feb. 12, 2015; 8 Pages.

International Search Report and Written Opinion; International Application No. PCT/US2011/061470; dated Apr. 9, 2014; 9 pages.

James Broberg, Rajkumar Buyya, Zhair Tari: MetaCDN: Harnessing 'Storage Clouds' for high performance content delivery; online publication date; Apr. 5, 2009: http://www.sciencedirect.com/science/article/pii/S1084804509000514.

Kennedy, James and Russell Eberhart. "Particle Swarm Optimization," Proceedings of the IEEE International Conference on Neural Networks (Perth, Australia), 1995, pp. 1942-1948, 7 pages.

Retzlaff et al. Conservation & Energy Potential Study for Smith River Rancheria:, Smith River Rancheria, Evergreen NRG/Strategic Energy Solutions, Aug. 2005, 417 pages.

U.S. Appl. No. 61/446,233; Inventor: Henze; filed Feb. 24, 2011, 17 pages.

ECONORTHWEST, "Process Evaluation of the SCE Aug. 2006 Home Energy Efficiency Survey (HEES) Program," Aug. 2009. <URL: http://www.calmac.org/publications/SCE_HEES_Final_Report_080409_calmac_edit.pdf> entire document, 121 pages.

WIPO International Search Report and Written Opinion, PCT/US2014/029543, dated Sep. 19, 2014, 12 pages.

* cited by examiner

DYNAMICALLY ADAPTIVE PERSONALIZED SMART ENERGY PROFILES

CROSS-REFERENCE TO RELATED APPLICATIONS

This application is a continuation of U.S. patent application Ser. No. 15/232,659, filed Aug. 9, 2016, which is a continuation of U.S. patent application Ser. No. 13/761,119, filed Feb. 6, 2013, now granted as U.S. Pat. No. 9,423,779, issued Aug. 23, 2016, both which are hereby incorporated by reference in their entireties.

BACKGROUND

Appliances and other energy-consuming devices are commonly shared by various members of a household or other environment. In many situations, these members are likely to have different settings preferences for those appliances and devices. For example, one member may prefer a thermostat setting of 68° F. while another prefers 78° F. while yet another prefers 64° F. These preferences may have significant impact on energy consumption as members of the environment readjust settings based on who is present. For example, as members enter and leave a room (i.e., transition to and from the room), the temperature may need to be readjusted (e.g., heated or cooled to meet the new demand). Thus, significant energy savings could be achieved by arriving at an optimal configuration for various appliances and devices.

DETAILED DESCRIPTION

Figure 1A:
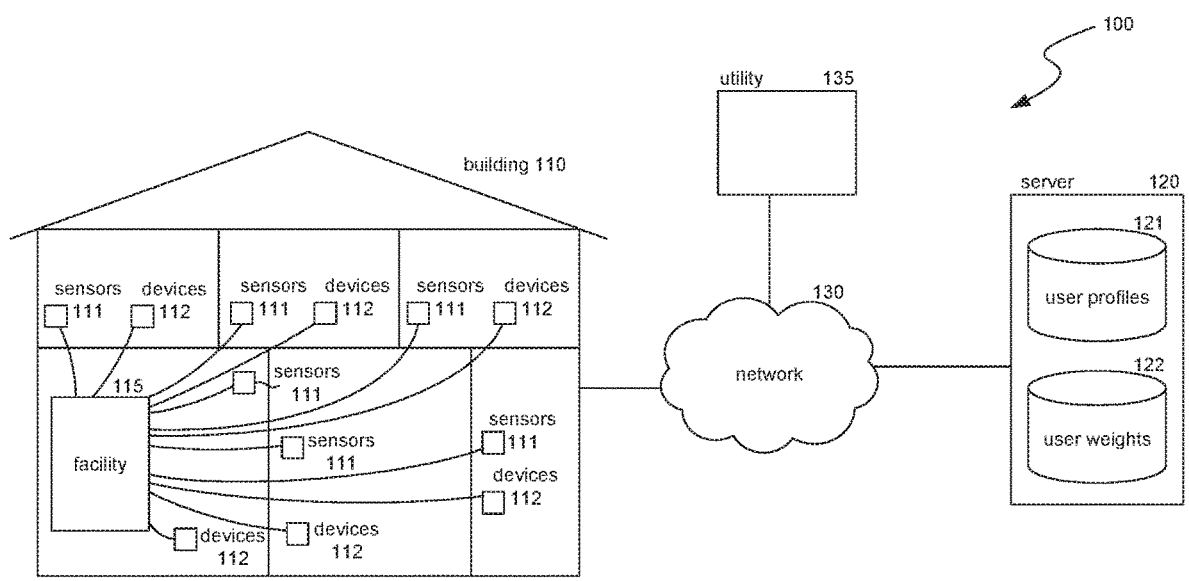
FIG. 1A is a block diagram illustrating an environment in which the facility may operate.

A facility employing systems, methods, and/or techniques for dynamically and adaptively configuring configurable energy consuming and producing devices (e.g., smart energy devices) based on user profiles and user presence information is disclosed. In some embodiments, the facility periodically detects or determines the presence of users within a defined area, such as a building, a room, an office, and so on, and retrieves preference information for those users, such as preferred settings for environmental conditions (e.g., temperature settings, brightness settings for a light, fan speed settings for fan or HVAC system), preferred entertainment settings (e.g., music, television, movies, volume), preferred energy consumption or production settings and parameters (e.g., maximum energy costs, maximum energy rates, preferred energy sources), and so on. For each of one or more configurable energy devices in the defined area, the facility generates a combined setting based on the preferences of each user present in the defined area and adjusts or modifies a control parameter of the devices based on the various combined settings. For example, if User A, User B, and User C are present in a room and User A's preferred temperature setting is 75° F., User B's preferred temperature setting is 68° F., and User C's preferred temperature setting is 70° F., the facility may generate a combined setting for a thermostat by taking the average preferred temperature setting of the users in the room (i.e., User A, User B, and User C). In this case, the average temperature setting is 71° F. [(75° F.+68° F.+70° F.)/3]. In response to determining that User A has left the room (or that User A has been gone for more than a predetermined period of time, such as 30 seconds, one minute, five minutes, 30 minutes, and so on), the facility may re-calculate the combined setting based on the preferred settings of User B and User C, in this case 69° F. [(68° F.+70° F.)/2]. In this manner, the facility will adjust the temperature in the room to a setting that takes into account the preferences of all of the users in the room.

As another example, the facility may also adjust lighting conditions within a room based on the preferences of those present in the room. In this case, the facility may assign discrete values to each of 5 different brightness settings for lights within a room (e.g., 1, 2, 3, 4, and 5 from off (1) to brightest (5)). If User A, User B, and User C are present in the same room and User A prefers a brightness setting of 5, User B prefers a brightness setting of 4, and User B prefers a brightness setting of 3, the facility can adjust the lights in the room to a brightness setting of 4 [(5+4+3)/3]. In the event that the average value does not correspond to one of the discrete values, the facility may round the average value to the nearest discrete value. Thus, if user C leaves or transitions from the room, the facility may re-calculate the average preferred value as 4.5 [(5+4)/2] and, depending upon the control scale, round the preferred value down to 4 (or up to 5) when adjusting the brightness of the lights in the room. In this manner, the facility will adjust the brightness of lights in the room to a setting that takes into account the preferences of all of the people in the room.

In some embodiments, the facility applies a weight or weighting factor to each of the user's preferences before calculating a combined setting value. In this manner, the preferences of certain users are given more (or less) consideration than the preferences of other users. For example, in a household with parents and children, the parents may have a higher weight than the children throughout the house. In another example, one or more of the parents may have a higher weight than each of the children in each room in the house. In another example, one or more parents may have a higher weight than each of the children except for the respective bedrooms of each of the children. In this manner, the preferences of the children will be given more weight in their respective bedrooms but will be given less weight in other rooms throughout the house. When calculating a weighted combined setting value, the facility may employ a weighted arithmetic mean, a weighted geometric mean, weighted harmonic mean, or other techniques.

By way of example, if User A, User B, and User C are present in a room and User A's preferred temperature setting is 75° F. and User A is assigned a weight of 10, User B's preferred temperature setting is 68° F. and user B is assigned at weight of 5, and User C's preferred temperature setting is 70° F. and user B is assigned at weight of 3, the facility may generate a combined setting for a thermostat based on a weighted arithmetic mean of the users in the room and their respective weights (i.e., User A, User B, and User C). In this example, the weighted arithmetic mean is calculated as $$\frac{75 \cdot 10 + 68 \cdot 5 + 70 \cdot 3}{10 + 5 + 3}$$

or 72.22° F., which is greater than the average temperature setting of 71° F. calculated above as a result of relatively high preferred temperature and weight of User A compared to the preferred temperatures and weights of User B and User C. In response to determining that User A has left the room, the facility may re-calculate the combined setting based on the preferred temperatures and weights of User B and User C, in this case $$\frac{68 \cdot 5 + 70 \cdot 3}{5 + 3}$$

or 68.75° F.

In some embodiments, the facility scales the weight of each user based on how long the user has been present. For example, the facility may multiple the weight by a factor proportional to the number of minutes that the user has been present. In the example above, if User A has been present for 30 minutes, User B has been present for 45 minutes, and User C has been present for 60 minutes, the facility may multiple User A's weight of 10 by 30 (300), multiple User B's weight of 5 by 45 (225), and multiple User C's weight of 3 by 60 (180). Using these values and a weighted arithmetic mean, the facility would calculate a combined setting for a thermostat as $$\frac{75 \cdot 300 + 68 \cdot 225 + 70 \cdot 180}{300 + 225 + 180}$$

or 71.49° F. In response to determining 10 minutes later that User A has left the room, the facility may re-calculate the combined setting based on the preferred temperatures and updated scaled weights of User B and User C, in this case $$\frac{68 \cdot 275 + 70 \cdot 210}{275 + 210}$$

or 68.87° F. In some embodiments, the facility may apply a maximum value or cap to the scaling factors so that all users who have been present for more than a threshold period have their weights scaled by the same factor. For example, the facility may set a maximum scaling factor of 60 so that all users who have been present for 60 minutes or more have their weights scaled by 60. In some embodiments, the facility may employ a non-linear scaling factor, such as $C*period$, $C*period^2$, $C*\log(period)$, $C*2^{period}$, and so on, where C represents a constant value and period represents an amount of time (e.g., milliseconds, seconds, minutes, hours) that the user has been present in, for example, a particular building, a particular floor of the building, a particular room within the building, and so on.

Although the above examples relate to adjusting a temperature setting based on user preferences, one skilled in the art will recognize that these techniques may also be applied to other devices and settings, such as lights, fans, window treatments (e.g., blinds, curtains), and so on. Additionally, these techniques may also be applied to entertainment devices, such as audio-playing devices (e.g., stereos, mp3 players, computing devices, set-top boxes), video-playing devices (e.g., televisions, set-top boxes, computing devices), and so on. For example, for an audio-playing or video-playing device users may be specify preferences for particular songs, artists, genres, television programs, actors, actresses, producers, directors, and so on and the facility may generate a combined setting for a group of users by identifying an intersection of preferred songs, artists, genres, television programs, actors, actresses, producers, and/or directors of the users (i.e., songs, artists, genres, television programs, actors, actresses, producers, and directors that appear on each of the users' lists of preferences) and generating a playlist based on the identified intersection or by generating a playlist that includes media selected from each of the users' preferences. In some examples, the selections may be based on weights associated with each user so that the playlist includes more selections from users with higher weights than from users with lower weights.

In some embodiments, the facility detects the presence of users using, for example, Global Positioning Systems (GPS) devices, mobile phones (GPS, Wi-Fi, cell tower triangulation, etc.), proximity detectors, voice recognition, radio frequency identification (RFID) tags, location tracking devices, and so on. For example, sensors throughout the building may detect the presence of users and report the presence information to the facility for storing in, for example, a presence database. As another example, an application running on a user's mobile phone may transmit location information to the facility for purposes of presence detection. The facility may be configured to periodically (e.g., every second, minute, hour, etc.) poll sensors and devices for user presence information or may receive push notifications from the sensors and devices periodically and/or in response to the sensors and devices detecting changes in presence information.

In some embodiments, the facility may employ geofencing techniques to create virtual boundaries between buildings and/or within a building and employ various sensors and devices, such as those discussed above, to detect the presence of users within different sections of a building. The virtual boundaries may correspond to physical boundaries within the building, such as different floors or rooms, or may correspond to different sections or zones within a room or area without internal physical boundaries. As users are detected within the various geofenced sections established by the virtual boundaries, the facility can configure various devices within those sections based on the preferences of the present users.

In some embodiments, rather than, or in addition to, using physical detection techniques, the facility may receive user schedules specifying when the user will be (or is expected to be) present within a building, room, etc. For example, one users' schedule may specify that the user will be at home and awake from 6 am to 7 am and from 6 pm to 11 pm, at home and asleep from 11 pm to 6 am, and away from home from 7 am to 6 pm. The scheduling information may also specify settings preferences for the user during the various periods, such as temperature settings, energy consumption settings, and so on. In this manner, the facility can use stored schedule information for users when, for example, the presence of users cannot be detected or a user chooses not to have his or her presence information provided to the facility in real-time.

FIG. 1A is a block diagram illustrating an environment in which the facility may operate in some embodiments. The environment 100 includes building 110, facility 115, a plurality of sensor sets 111, and a plurality of devices 112. Building 110 may represent any type of building, such as a house, office building, stadium, apartment complex, etc. Sensor sets 111, which communicate with the facility, may include any number and type of sensor for detecting and measuring operating conditions, environmental conditions, and/or the presence of users, such as thermostats, thermometers, motion detectors, windows or door sensors (e.g., sensors to detect whether windows and doors are open), sensors for detecting fan/blower speed, central heating unit settings, occupancy sensors, sensors measuring site-generated energy production, audio/video recording devices, etc., GPS devices, mobile telephones, RFID tags and readers, Bluetooth devices, and may be associated with another system within the building, such as a Heating, Ventilation, and Air Conditioning (HVAC) system, entertainment system, etc. Although in this example each area of building 110 includes a set of sensors, one skilled in the art will recognize that the facility may be used in an environment with any number of sensors and/or areas with or without sensors. Environment 100 also includes server 120, which includes user profile store 121 and user weight store 122. In some examples, the facility may download user profile and weight information from the server. Thus, facilities responsible for maintaining conditions in different buildings can download appropriate preference information as the user is detected in different buildings. For example, a facility that manages conditions for a hotel chain may download the preferences of users staying in a room when the users are detected in the room and automatically configure devices within the room based on the preferences of the users. In some cases, the server may also provide information from utilities 135 pertaining to energy cost data, such as cost schedules (e.g., the price of energy per unit at different times of the day, month, year) or demand schedules that indicate the utility's preferred energy consumption levels at various times of the day, month, year, etc. Building 110 and facility 115 may communicate with utilities 135 and server 120 via network 130.

Figure 1B:
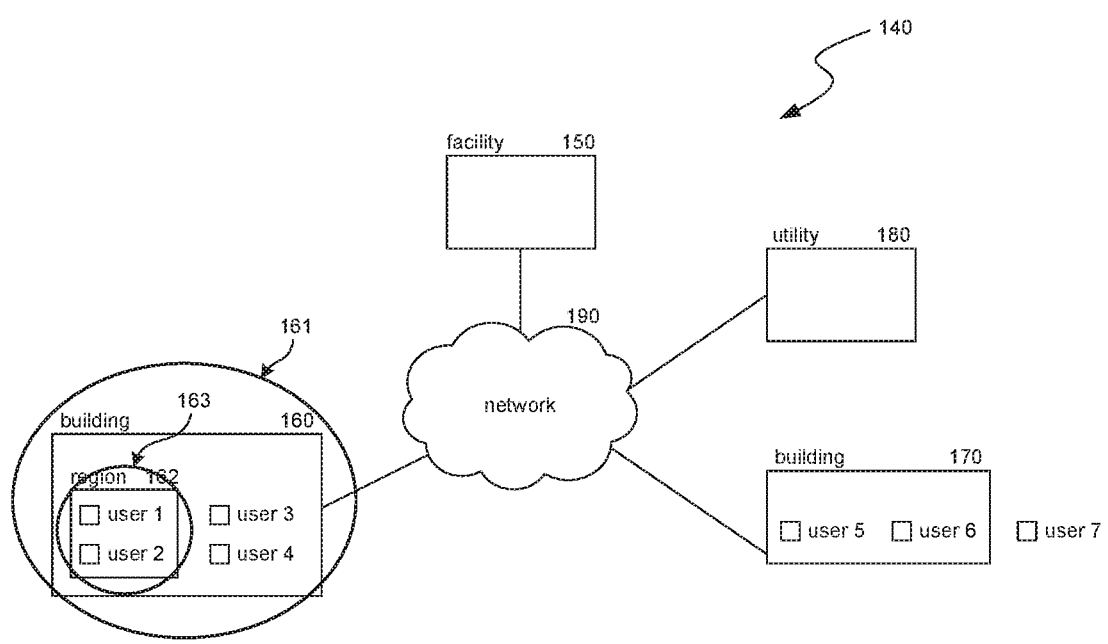
FIG. 1B is a block diagram illustrating another environment in which the facility may operate.

FIG. 1B is a block diagram illustrating another environment in which the facility may operate. The environment 140 includes facility 150, buildings 160 and 170, and utilities 180. Each of buildings 160 and 170 is comprised of a plurality of sensors (not shown) and devices (not shown) to detect the presence of users and a number of configurable energy devices (not shown) that the facility can control based on user preferences. In this example, the facility is remotely-located from the buildings and communicates with sensors and devices in the buildings via network 190. Accordingly, the sensors and devices are configured to provide presence information to the facility which, in turn, communicates settings to the configurable devices in the buildings. Additionally, building 160 is surrounded by geofence 161 while region 162, within building 160, is surrounded by geofence 163. In some configurations, the preferences of user1 and user2, each of whom are within geofence 163, can be used to configure devices within region 162 while the preferences of user3 and user4, each of whom are within geofence 161 but not within geofence 163, can be used to configure devices within building 160 but not within region 162. Thus, use of a user's preferences can be limited to the "innermost" regions or areas in which the users are present. In other configurations, a user's preferences may be used in any or all of the regions or areas in which the users are present. For example, each of user1's, user2's, user3's, and user4's preferences can be used to configured devices within building 160 (and that are not in region 162). Devices within building 170 can be configured based on the preferences of user5 and user6. The preferences of user7, who is not located within building 160 or building 170, may be ignored when configuring devices within these buildings. However, if a stored schedule for user7 indicates that user7 should be present within building 170, then the facility may take into account user7's preferences when configuring devices within building 170.

The computing devices on which the disclosed facility is implemented may include a central processing unit, memory, input devices (e.g., keyboard and pointing devices), output devices (e.g., display devices), and storage devices (e.g., disk drives). The memory and storage devices are computer-readable storage media that may be encoded with computer-executable instructions that implement the technology, which means a computer-readable storage medium that contains the instructions. In addition, the instructions, data structures, and message structures may be transmitted via a computer-readable transmission medium, such as a signal on a communications link. Thus, computer-readable media comprises both computer-readable storage media for storing and computer-readable transmission media for transmitting. Additionally, data used by the facility may be encrypted. Various communications links may be used, such as the Internet, a local area network, a wide area network, a point-to-point dial-up connection, a cell phone network, wireless networks, and so on.

The disclosed facility may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments, including cloud-based implementations.

Many embodiments of the technology described herein may take the form of computer-executable instructions, including routines executed by a programmable computer. Those skilled in the relevant art will appreciate that aspects of the technology can be practiced on computer systems other than those shown and described herein. Embodiments of the technology may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on. Moreover, the technology can be embodied in a special-purpose computer or data processor that is specifically programmed, configured or constructed to perform one or more of the computer-executable instructions described herein. Accordingly, the terms "computer" or "system" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display, LCD, LED display, OLED display, and so on.

The technology can also be practiced in distributed environments, where tasks or modules are performed by remote processing devices linked through a communications network. In a distributed computing environment, program modules or subroutines may be located in local and remote memory storage devices. Aspects of the technology described herein may be stored or distributed on computer-readable media, including magnetic or optically readable or removable computer disks. Furthermore, aspects of the technology may be distributed electronically over networks. Data structures and transmissions of data particular to aspects of the technology are also encompassed within the scope of the technology.

Figure 2:
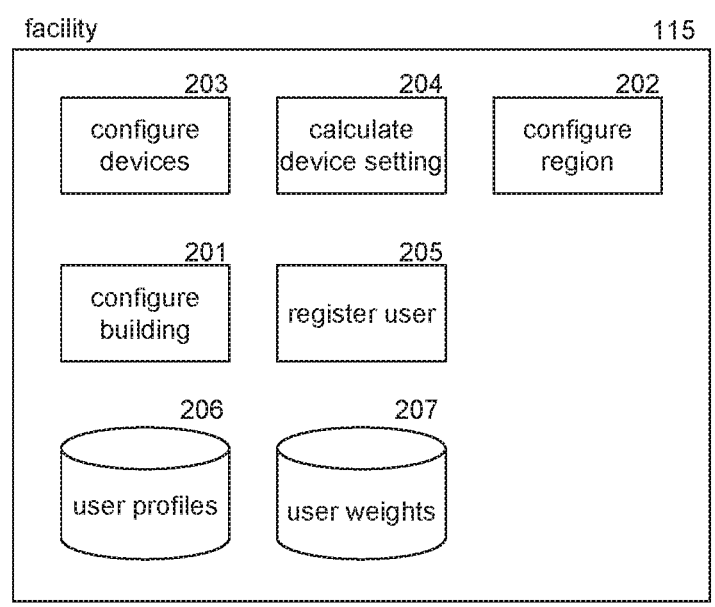
FIG. 2 is a block diagram illustrating various components that the facility may include.

FIG. 2 is a block diagram illustrating various components that the facility may include. In this embodiment, the facility comprises configure building component 201, configure region component 202, configure devices component 203, calculate device setting component 204, register user component 205, user profiles store 206, and user weights store 207. Configure building component 201 is invoked to configure devices within different regions of a building based on the users present (or assumed to be present based on schedule information) in the regions. Configure region component 202 is invoked by the configure building component 201 to configure devices within a specific region. Configure devices component 203 is invoked by the configure region component 202 to apply calculated settings to devices in a region. Calculate device setting component 204 is invoked by the configure devices component 203 to calculate a combined setting for a device based on user preferences. Register user component 205 is invoked to collect user preference information, to register devices for detection, and/or to collect receive schedule information. User profiles store 206 and user weights store 207 store user preference information and user weights, respectively. The stored information may be collected by the facility during a registration process and/or may be retrieved from another source, such as server 120, a mobile device (e.g., smart phone) carried by a user, an RFID tag, etc.

Figure 3:
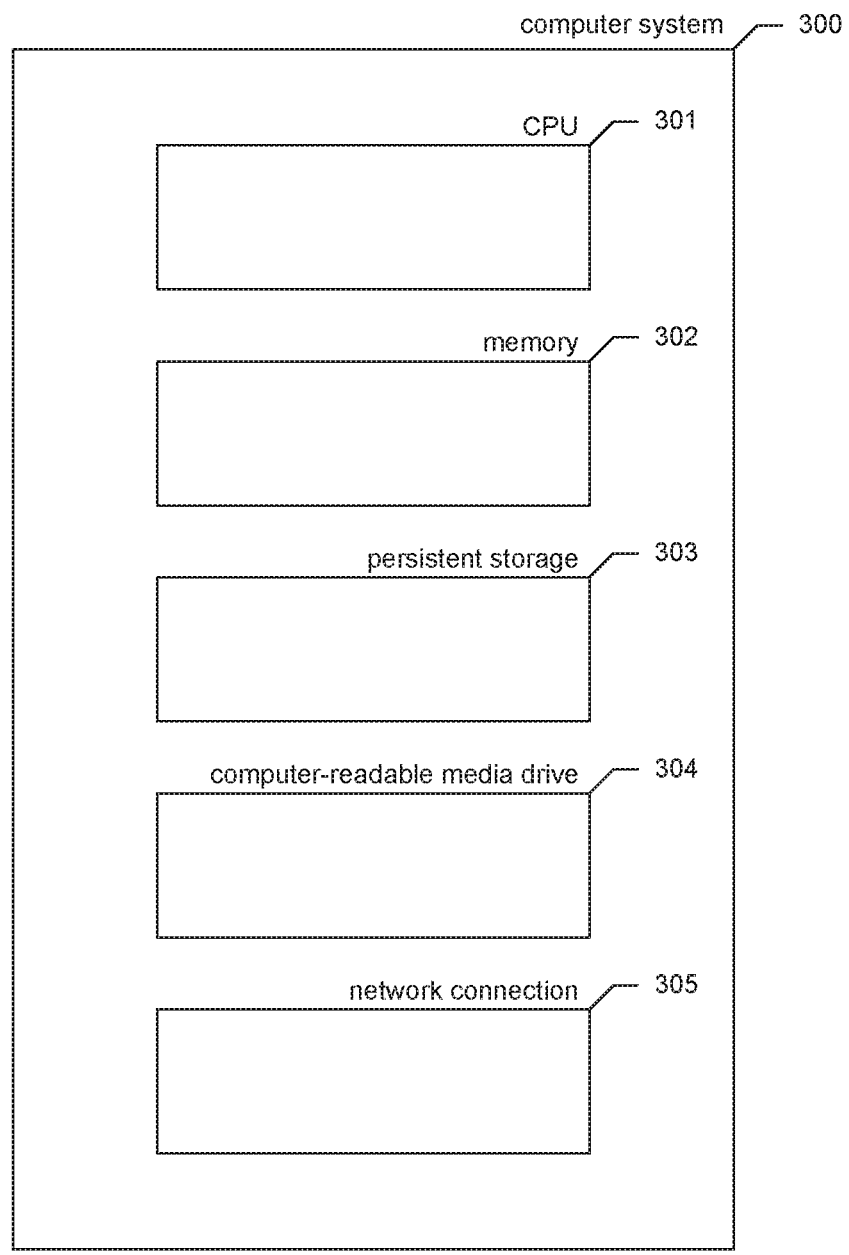
FIG. 3 is a block diagram showing some of the components incorporated in computing systems associated with the facility.

FIG. 3 is a block diagram showing some of the components incorporated in computing systems associated with the facility, such as a controlled device, a user computer, or a utility, in some embodiments. Computer system 300 comprises one or more central processing units ("CPUs") 301 for executing computer programs; a computer memory 302 for storing programs and data while they are being used; a persistent storage device 303, such as a hard drive for persistently storing programs and data; a computer-readable media drive 304, such as a CD-ROM drive, for reading programs and data stored on a computer-readable medium; and a network connection 305 for connecting the computer system to other computer systems, such as via the Internet. While computer systems configured as described above are preferably used to support the operation of the facility, those skilled in the art will appreciate that the facility may be implemented using devices of various types and configurations.

Figure 4:
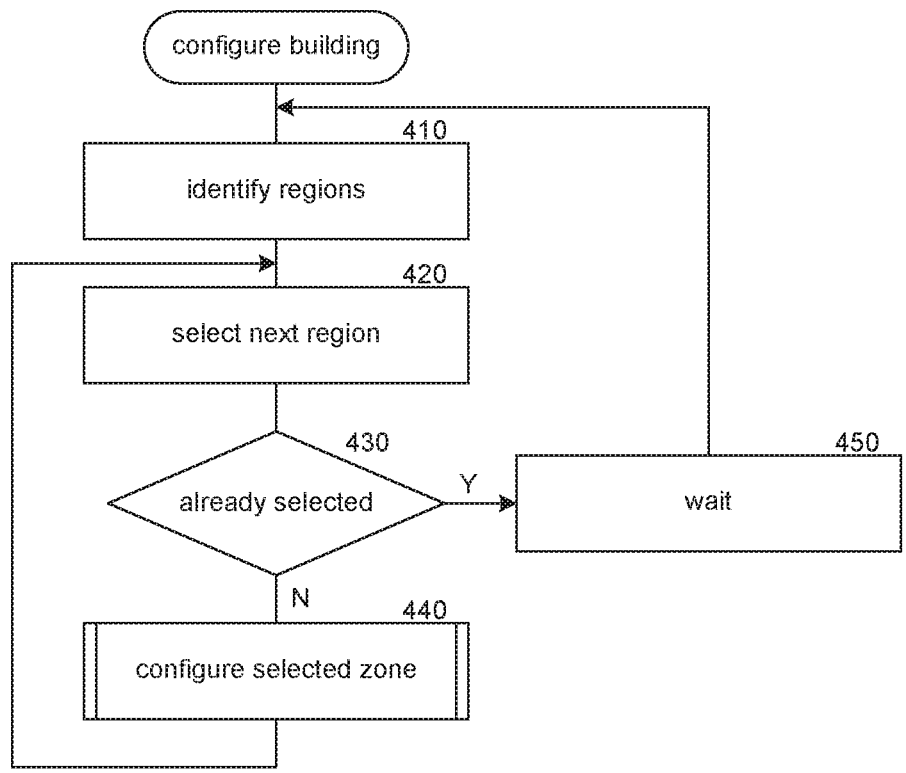
FIG. 4 is a flow diagram illustrating the processing of a configure building component.

FIG. 4 is a flow diagram illustrating the processing of a configure building component in some embodiments. The configure building component is invoked to configure devices within different regions of a building (or buildings) based on the users present (or assumed to be present based on schedule information) in the regions. In block 410, the component identifies available regions within the building. For example, the component may access geofencing information, detect the presence of groupings of sensors and devices, or retrieve stored information specifying groups of sensors and devices. In block 420, the component selects the next region. In decision block 430, if the selected region has already been selected then the component continues at block 450, else the component continues at block 440. In block 440, the component invokes a configure selected region component and then loops back to block 420 to select the next region. In block 450, the component waits until prompted to continue and then loops back to block 410 to identify regions. For example, the component may be prompted to continue when an associated device or sensor indicates a change in presence or preference information. As another example, the component may be configured to wait a predetermined period of time (e.g., a second, a minute, an hour) before continuing.

Figure 5:
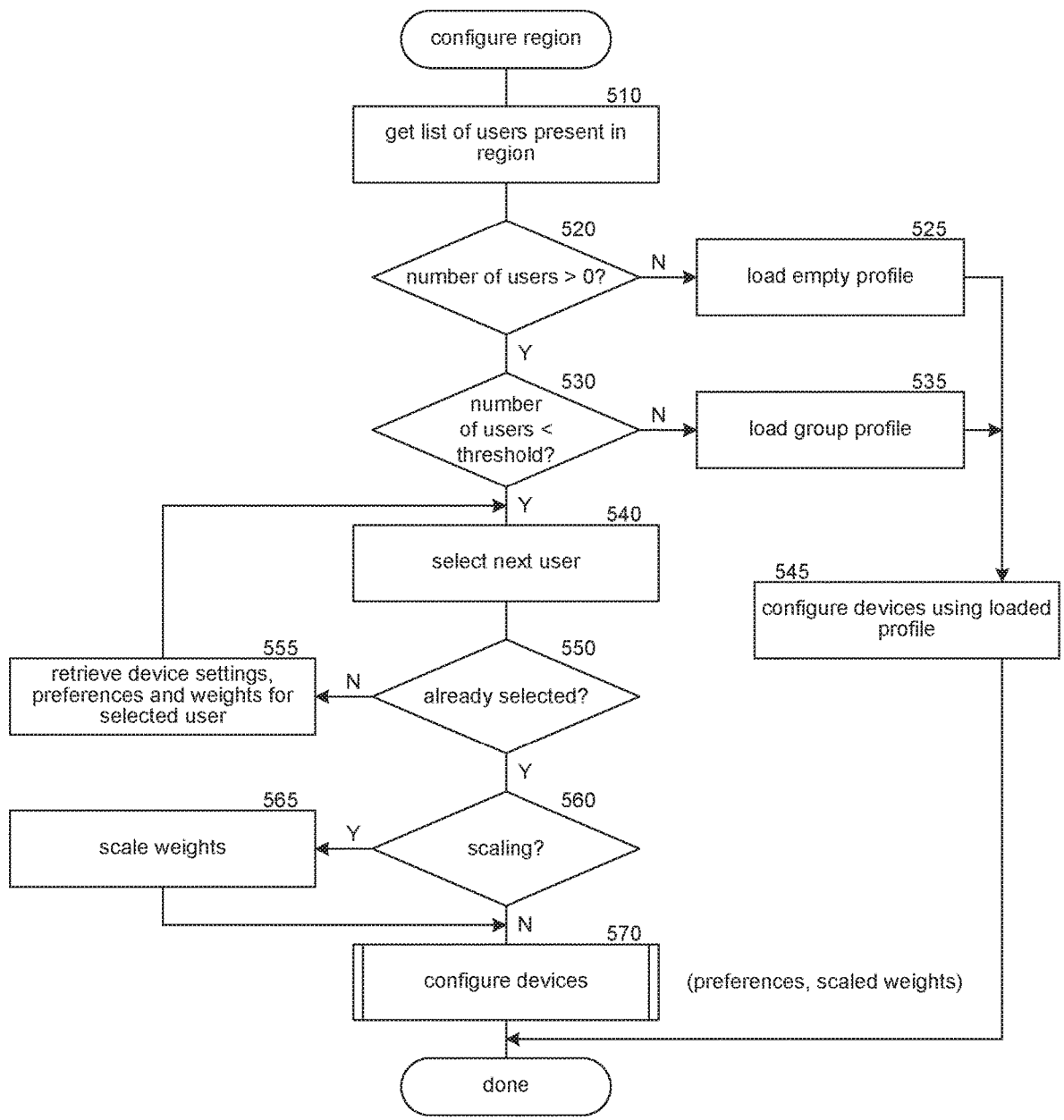
FIG. 5 is a flow diagram illustrating the processing of a configure region component.

FIG. 5 is a flow diagram illustrating the processing of a configure region component in some embodiments. The configure region component is invoked to configure energy devices within a specific region. In block 510, the component retrieves a list of users present in the region. The list of users may be collected from various sensors and devices within the region, such as GPS devices, mobile phones, presence sensors, and so on. Additionally, the list of users may include users who have provided scheduling information indicating that they should be presumed to be present in the region or building. In some embodiments, the list of users may be retrieved from a presence database maintained or managed by the facility or a separate system. In decision block 520, if the number of users present in the region is greater than 0, then the component continues at decision block 530, else the component continues at block 525. In block 525, the component loads an empty profile (a profile indicating that no users are present in the region and specifying settings for the configurable energy devices in the region) and then continues at block 545. In decision block 530, if the number of users is greater than a predetermined threshold (e.g., 10, 20, 30) then the component continues at block 540, else the component continues at block 535. In block 535, the component loads a group profile (a profile indicating that more than the predetermined threshold number of users are present and specifying settings for the configurable energy devices in the region) and then continues at block 545. In block 545, the component configures the configurable energy devices in the region using the loaded profile and then completes. In block 540, the component selects the next user. In decision block 550, if the user has already been selected, then the component continues at block 560, else the component continues at block 555. In block 555, the component retrieves device setting preferences and weights for the selected user and then loops back to block 540 to select the next user. For example, the component may retrieve the information from a user profile store of the facility or a remotely located user profile store. As another example, the component may retrieve the information from a device associated with the user, such as the user's mobile phone, an RFID tag, and so on. If the component is unable to retrieve preference and weight information for a user (e.g., if the user has not been registered, a profile for the user is not available, or the user cannot be properly identified), the component may use pre-configured default preferences (e.g., a default user profile) for the user or may not include the user when configuring devices. In decision block 560, if the component is configured to scale the weights, then the component continues at block 565, else the component continues at block 570.

In block 565, the component scales the weights based on, for example, how long the users have been present in the region or the building. In block 570, the component invokes a configure devices component to configure the configurable energy devices in the region, and then completes.

Figure 6:
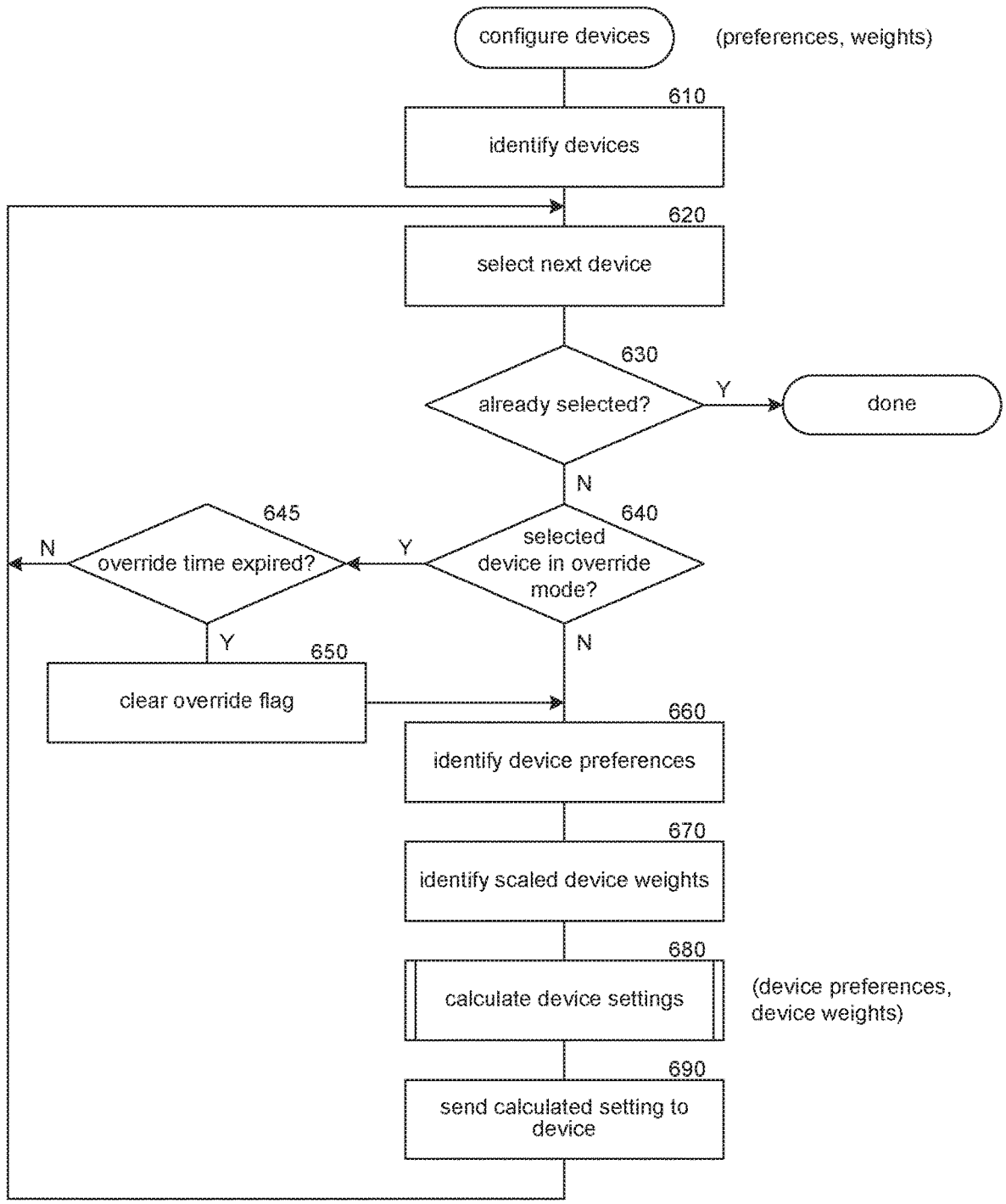
FIG. 6 is a flow diagram illustrating the processing of a configure devices component.

FIG. 6 is a flow diagram illustrating the processing of a configure devices component in some embodiments. The configure devices component is invoked to apply calculated settings to devices in a region. In block 610, the component retrieves a list of configurable energy devices within the region. In block 620, the component selects the next configurable energy device. In decision block 630, if the configurable energy device has already been selected, then the component completes, else the component continues at decision block 640. In decision block 640, if the selected device is in override mode, then the component continues at decision block 645, else the component continues at block 660. In decision block 645, if the override time for the selected device has expired, then the component continues at block 650, else the component loops back to block 620 to select the next device. In block 650, the component clears an override flag to take the device out of override mode. In block 660, the component identifies user preferences associated with the selected device—such as the temperature preferences for a thermostat, fan settings for an HVAC system, and so on for the users in the region—by, for example, accessing a user profile store. In block 670, the component identifies the weights of the users in the region by, for example, accessing a user weights store. In block 680, the component invokes a calculate device setting to calculate a combined setting for the device. In block 690, the component adjusts the selected device by, for example, sending the calculated setting to the selected device using a software or hardware interface provided by or associated with the device, and then loops back to block 620 to select the next device.

Figure 7:
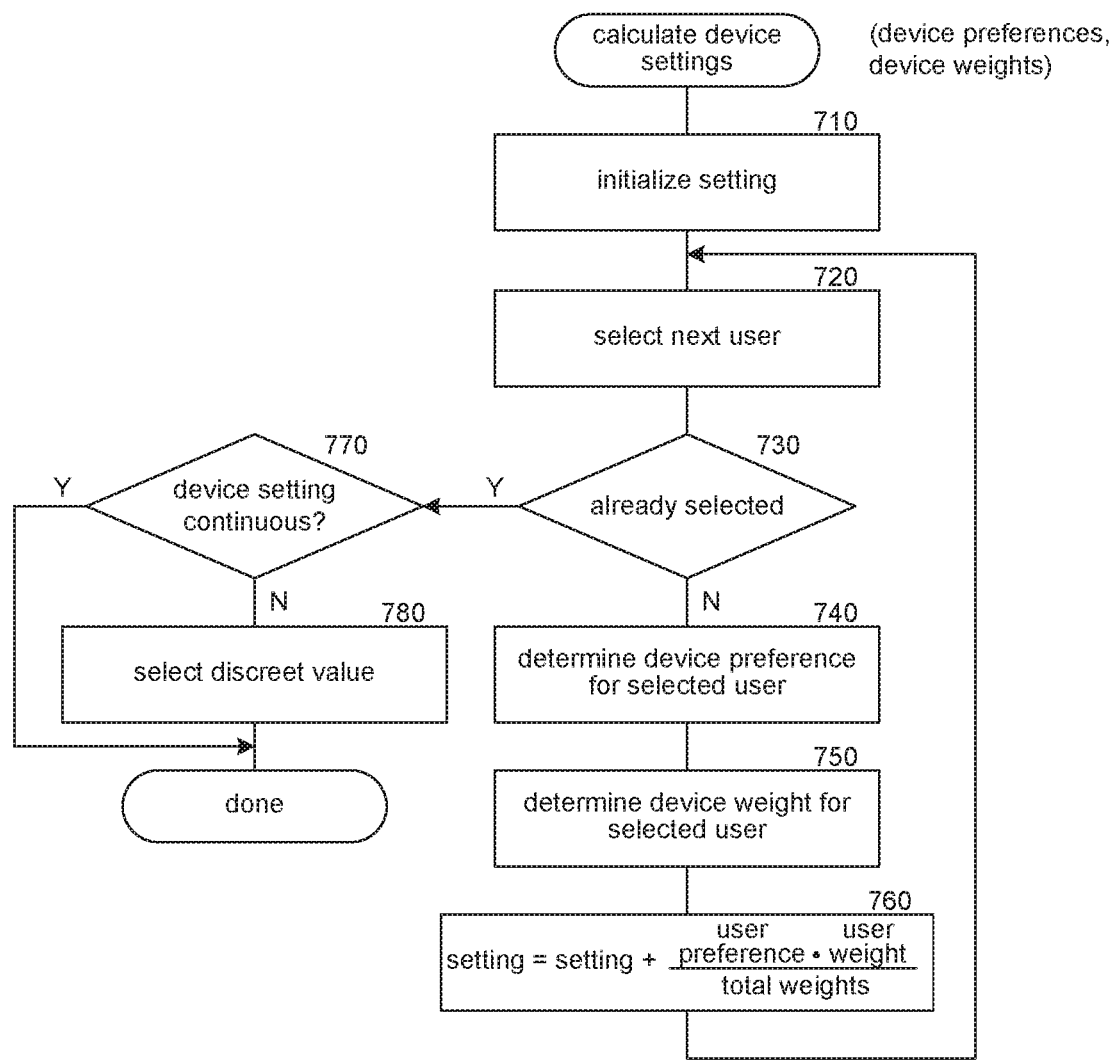
FIG. 7 is a flow diagram illustrating the processing of a calculate device setting component.

FIG. 7 is a flow diagram illustrating the processing of a calculate device setting component in some embodiments. The calculate device setting component is invoked to calculate a combined setting for a device based on user preferences and user weights. In block 710, the component initializes a settingvalue variable. In block 720, the component selects the next user. In decision block 730, if the user has already been selected, then the component continues at decision block 770, else the component continues at block 740. In block 740, the component determines the selected user's setting preference for the device. In block 750, the component determines the selected user's weight for the device. In block 760, the component sets the settingvalue variable equal to $$settingvalue + \frac{\text{user preference} \cdot \text{user weight}}{\text{sum of user weights}}$$

and then loops back to block 720 to select the next user. In this manner, the settingvalue will be set to $$\frac{\sum_{i=1}^{n}(\text{preference}_i \cdot \text{userweight}_i)}{\sum_{i=1}^{n} \text{weight}_i}$$

wherein n represents the number of users present, preference$_i$ represents a setting preference for the i$^{th}$ user, and weight$_i$ represents a weight for the i$^{th}$ user. Although in this example the component uses a weighted arithmetic mean, one skilled in the art will recognize that other means may be employed such as a non-weighted arithmetic mean, a weighted geometric mean, a non-weighted geometric mean, a weighted harmonic mean, a non-weighted harmonic mean, and so on. In decision block 770, if the device is configured to accept settings along a continuous range, then the component completes, else the component continues at block 780. In block 780, the component selects a discreet value based on the calculated value by, for example, rounding the calculated value to nearest acceptable value, taking the floor of the value, taking the ceiling of the value, and so on. For example, a thermostat may be configured to accept values along a closed or open continuous interval whereas a lamp may be configured to accept one of only three discrete values (e.g., off, dim, bright).

Figure 8:
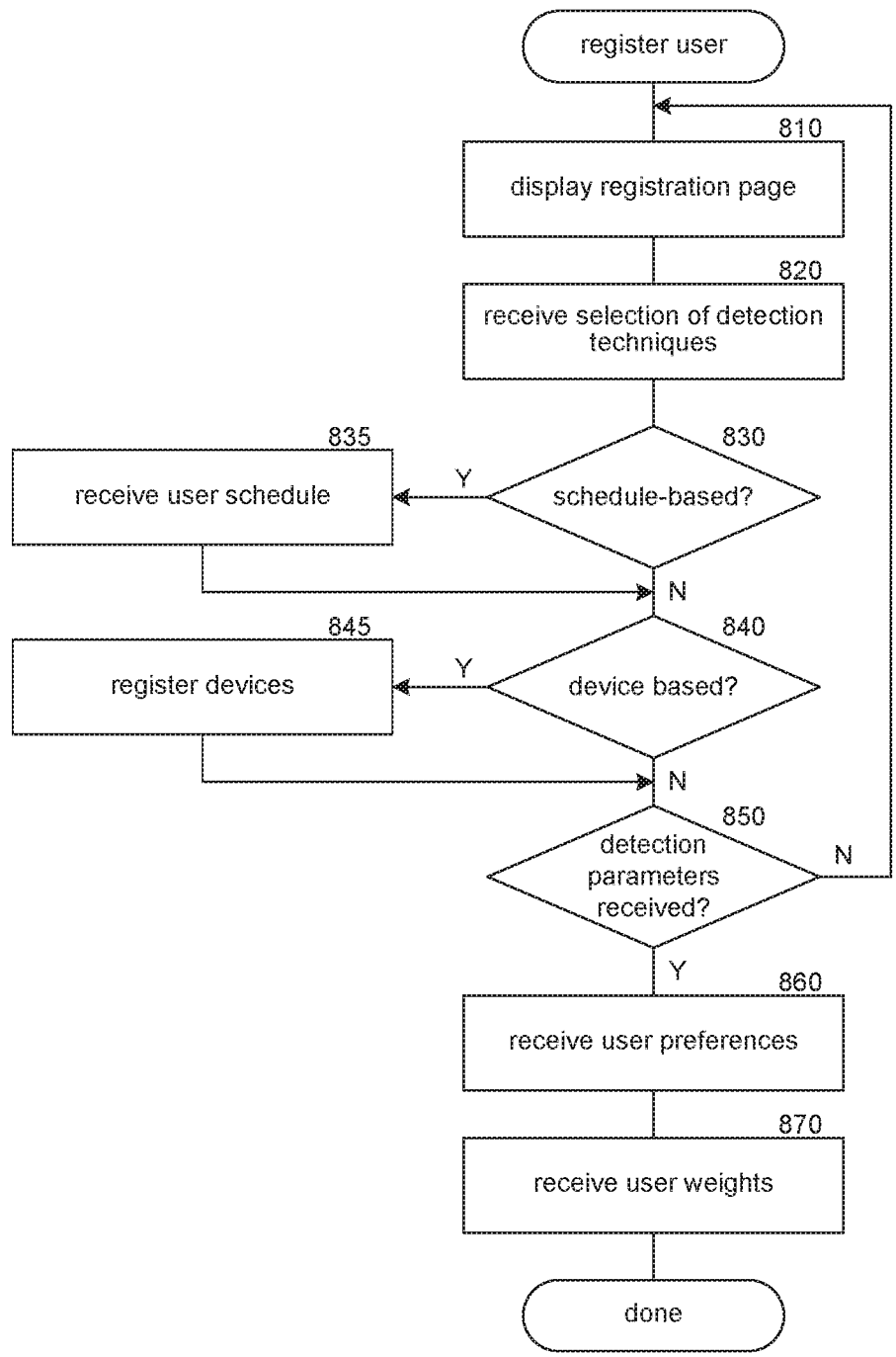
FIG. 8 is a flow diagram illustrating the processing of a register user component.

FIG. 8 is a flow diagram illustrating the processing of a register user component. The register user component is invoked to collect user preference information, to register devices for detection, and/or to collect receive schedule information. In block 810, the component displays to a user a registration page, such as a web page accessible via a web browser, a page displayed by an application running on a computing device, such as a smart phone, a page displayed by an energy device or system within a building, such as a thermostat, HVAC system, television, refrigerator, and so on. In block 820, the component receives a selection of one or more detection techniques for the user, such as schedule-based or device-based detection options. For example, the user may select, from a list of detection techniques, those techniques that the user expects the facility to be able to use to detect the user. In decision block 830, if the user has selected a schedule-based detection technique, then the component continues at block 835, else the component continues at decision block 840. In block 835, the component receives a schedule from the user. For example, the component may display a calendar-based interface that enables a user to specify when and where the user expects to be during a given day, week, month, and so on. In some examples, the user may specify general scheduling information for a day, week, month and so on that the facility can use until the user changes their schedule. In decision block 840, if the user has selected device-based detection techniques, then the component continues at block 845, else the component continues at decision block 850. In block 845, the component registers devices and information used to detect the user. For example, the user may provide identification information for a mobile device (e.g., smart phone) or RFID tag that can be used to identify the presence of a user. As another example, the user may record their voice in response to prompts from the component if audio sensing devices are available to detect the user. In decision block 850, if detection parameters have been received then the facility continues at block 860, else the component loops back to block 810. In block 860, the component receives preference information for the user, such as thermostat settings, energy consumption preferences, fan settings, entertainment settings, and so on. The user may specify different preferences for different times and different locations. For example, the user may prefer higher temperature settings at home than at work or lower temperature settings in the summer versus the winter. The user may also specify different preferences for different sources of energy. For example, the user may be specify one temperature preference to be used when the source of energy is solar, wind, geothermal and another temperature preference to be used when the source of energy is coal or oil. The user may also specify different preferences for a device based on different modes of the device, such as heating and cooling modes for a thermostat and associated HVAC system. Table 1 illustrates sample temperature preference information for a user at home for different times of the day (e.g, day, night), different energy sources (e.g., solar or wind, coal or oil), different modes (e.g., heating or cooling).

TABLE 1

| Time  | Energy Source(s) | Mode    | Preference |
|-------|------------------|---------|------------|
| Day   | Solar | Wind     | Heating | 72° F.     |
| Day   | Coal | Oil       | Heating | 68° F.     |
| Day   | Solar | Wind     | Cooling | 60° F.     |
| Day   | Coal | Oil       | Cooling | 66° F.     |
| Night | Solar | Wind     | Heating | 66° F.     |
| Night | Coal | Oil       | Heating | 62° F.     |
| Night | Solar | Wind     | Cooling | 72° F.     |
| Night | Coal | Oil       | Cooling | 76° F.     |

In some embodiments, the facility may monitor changes to different devices by the user to determine the user's preferences for different devices. For example, if a user regularly adjusts the temperature in a certain room to 70° F., the facility may update the user's preferences to reflect this setting or may notify the user of the discrepancy and ask that the user confirm a change to the user's preferences (e.g., via an email, text message, or application running on the user's mobile device). In block 870, the component receives user weights for the user and then completes. A user may have more than one associated weight based on, for example, different locations and/or times. For example, a user may receive a first weight for a home location and another weight (higher or lower) for a work location or for certain room(s) in the home versus another room(s) in the home, etc. As another example, a user may receive a higher weight for a work location after hours than during regular business hours. The user registration process may be performed as an initialization process for a user and/or to update previously-received information for the user.

Although the subject matter has been described in language specific to structural features and/or methodological acts, it is to be understood that the subject matter defined in the appended claims is not necessarily limited to the specific features or acts described above. For example, the order of the steps may be rearranged; some steps may be performed in parallel; shown steps may be omitted, or other steps may be included; etc. Rather, the specific features and acts described above are disclosed as example forms of implementing the claims. Accordingly, the invention is not limited except as by the appended claims.

I claim:

1. A method for automatically configuring configurable devices within a building based on the presence of users within the building, the method comprising:
   collecting presence information for each of a plurality of users of the building; and
   for each of a plurality of regions within the building,
      in response to determining that there is at least one user, and no more than a predetermined threshold number of users, present in the region within the building,
         for each user present in the region within the building,
            retrieving a weighting factor associated with the user, and
            retrieving a setting preference for one or more configurable device of the region within the building, and
            scaling the retrieved weighting factor,
         generating a weighted sum based on the scaled weighting factors and the retrieved setting preferences, and
         controlling the one or more configurable device in accordance with the generated weighted sum so that the one or more configurable device is controlled based on a setting preference of the at least one user.

2. The method of claim 1, further comprising for each of a plurality of regions within the building, and in response to determining that there are no users present in the region within the building, loading an empty profile for the region.

3. The method of claim 1, further comprising for each of a plurality of regions within the building, and in response to determining that there are more than the predetermined threshold number of users present in the region within the building, loading a group profile for the region.

4. The method of claim 1 wherein at least one of the plurality of configurable devices of the region within the building is a thermostat, and wherein each of the setting preferences for the thermostat is a temperature setting.

5. The method of claim 1 wherein the weighted sum is generated according to the formula $$\frac{\sum_{i=1}^{n} (\text{preference}_i \cdot \text{weight}_i)}{\sum_{i=1}^{n} \text{weight}_i}$$

wherein n represents the number of users present in a first region within the building, $\text{preference}_i$ represents a setting preference for the $i^{th}$ user, and $\text{weight}_i$ represents a scaled weighting factor for the $i^{th}$ user.

6. The method of claim 1 wherein collecting presence information for each of a plurality of users of the building comprises collecting presence information transmitted from a mobile phone.

7. The method of claim 1 wherein at least a portion of the collected presence information is based on a stored schedule for at least one user.

8. The method of claim 1, further comprising:
   for each user present in a first region within the building, determining an amount of time that the user has been present in the first region,
   wherein scaling the retrieved weighting factors is based at least in part on the amount of time that an associated user has been present in the first region.

9. A method for automatically configuring a configurable device within a building based on the presence of users within the building, the method comprising:
   collecting presence information for each of a plurality of users of the building;
   determining a number of users in a region associated with the configurable device,
   determining that the number of users in the region associated with the configurable device exceeds a predetermined threshold,
   wherein the predetermined threshold is greater than zero; and in response to determining that the number of users in the region associated with the configurable device exceeds the predetermined threshold,
retrieving a combined setting based on a retrieved setting preference for the configurable device for each user present in the region associated with the configurable device, and
controlling the configurable device based on the generated combined setting.

10. The method of claim 9 wherein the configurable device of the region within the building is a thermostat, and wherein each of the setting preferences for the thermostat is a temperature setting.

11. The method of claim 9 wherein the weighted sum is generated according to the formula $$\frac{\sum_{i=1}^{n}(\text{preference}_i \cdot \text{weight}_i)}{\sum_{i=1}^{n}\text{weight}_i}$$

wherein n represents the number of users present in a first region within the building, $\text{preference}_i$ represents a setting preference for the $i^{th}$ user, and $\text{weight}_i$ represents a scaled weighting factor for the $i^{th}$ user.

12. The method of claim 9 wherein collecting presence information for each of a plurality of users of the building comprises collecting presence information transmitted from a mobile phone.

13. The method of claim 9 wherein at least a portion of the collected presence information is based on a stored schedule for at least one user.

14. The method of claim 9, further comprising:
for each user present in a first region within the building, determining an amount of time that the user has been present in the first region,
wherein scaling the retrieved weighting factors is based at least in part on the amount of time that an associated user has been present in the first region.

15. A method for automatically configuring a configurable device within a building based on the presence of users within the building, the method comprising:
collecting presence information for each of a plurality of users of the building; and
determining that there is at least one user, and no more than a predetermined threshold number of users, present in a region within the building associated with the configurable device,
for each user present in the region within the building, retrieving a weighting factor associated with the user, and
retrieving a setting preference for the configurable device of the region within the building, and
scaling the retrieved weighting factor,
generating a weighted sum based on the scaled weighting factors and the retrieved setting preferences
generating an adjusted setting preference based on the weighted sum, and
controlling the configurable device based on the adjusted setting preference.

16. The method of claim 15, further comprising for each of a plurality of regions within the building, and in response to determining that there are no users present in the region within the building, retrieving an empty profile for the region and executing a setting preference associated with the empty profile.

17. The method of claim 15, further comprising for each of a plurality of regions within the building, and in response to determining that there are more than the predetermined threshold number of users present in the region within the building, retrieving a group profile for the region and executing a setting preference associated with the group profile.

18. The method of claim 15 wherein the weighted sum is generated according to the formula $$\frac{\sum_{i=1}^{n}(\text{preference}_i \cdot \text{weight}_i)}{\sum_{i=1}^{n}\text{weight}_i}$$

wherein n represents the number of users present in a first region within the building, $\text{preference}_i$ represents a setting preference for the $i^{th}$ user, and $\text{weight}_i$ represents a scaled weighting factor for the $i^{th}$ user.

19. The method of claim 15 wherein at least a portion of the collected presence information is based on a stored schedule for at least one user.

20. The method of claim 15, further comprising:
for each user present in a first region within the building, determining an amount of time that the user has been present in the first region,
wherein scaling the retrieved weighting factors is based at least in part on the amount of time that an associated user has been present in the first region.

* * * * *